(12) United States Patent
Su

(10) Patent No.: US 11,541,469 B2
(45) Date of Patent: Jan. 3, 2023

(54) ROTARY CUTTER FOR CUTTING DAMAGED THREADS OF A BOLT

(71) Applicant: Hong Ann Tool Industries Co., Ltd., Taichung (TW)

(72) Inventor: Cheng-Wei Su, Taichung (TW)

(73) Assignee: Hong Ann Tool Industries Co., Ltd., Taichung (TW)

(*) Notice: Subject to any disclaimer, the term of this patent is extended or adjusted under 35 U.S.C. 154(b) by 0 days.

(21) Appl. No.: 17/227,509

(22) Filed: Apr. 12, 2021

(65) Prior Publication Data

US 2021/0229202 A1 Jul. 29, 2021

Related U.S. Application Data

(63) Continuation-in-part of application No. 16/787,222, filed on Feb. 11, 2020.

(30) Foreign Application Priority Data

Jun. 10, 2019 (TW) .................................. 108119937

(51) Int. Cl.
*B23G 9/00* (2006.01)
*B23B 5/16* (2006.01)
*B23B 51/10* (2006.01)

(52) U.S. Cl.
CPC .............. *B23G 9/009* (2013.01); *B23B 5/167* (2013.01); *B23B 51/103* (2013.01)

(58) Field of Classification Search
CPC ..... B23B 5/167; B23B 51/101; B23B 51/103; B23B 2220/08; B23G 9/003; B23G 9/009
See application file for complete search history.

(56) References Cited

U.S. PATENT DOCUMENTS

| 2,292,581 | A | * | 8/1942 | Richardson | B23G 9/004 470/57 |
| 3,242,526 | A | * | 3/1966 | Wilton | F21V 35/00 431/154 |
| 4,798,503 | A | * | 1/1989 | Huju | B23B 49/04 144/30 |
| 5,054,972 | A | * | 10/1991 | Cooney | B23B 5/167 408/233 |
| 10,293,410 | B2 | * | 5/2019 | Yu | B23B 5/167 |
| 10,654,108 | B2 | | 5/2020 | Su | |
| 2008/0050191 | A1 | * | 2/2008 | Catlin | B23B 5/167 408/231 |

(Continued)

*Primary Examiner* — Boyer D Ashley
*Assistant Examiner* — Reinaldo A Vargas Del Rio
(74) *Attorney, Agent, or Firm* — Karin L. Williams; Alan D. Kamrath; Mayer & Williams PC

(57) ABSTRACT

A rotary cutter for cutting damaged threads of a bolt includes a body rotatable about a rotating axis. The body includes an inner periphery delimiting a conic cutting space. The body further includes at least one cutting blade, an evasive groove, an evasive portion, a scrap discharge groove, a scrap guide groove and a scrap discharge orifice on the inner periphery delimiting the cutting space. The at least one cutting blade forms a ridge. The evasive groove and the scrap discharge groove are respectively located on a rear side and a front side of the at least one cutting blade along a circumferential direction of the inner periphery of the body. The scrap guide groove extends between the evasive groove and the scrap discharge orifice.

12 Claims, 10 Drawing Sheets

(56) References Cited

U.S. PATENT DOCUMENTS

| | | | |
|---|---|---|---|
| 2016/0082517 A1* | 3/2016 | Ferguson | B23B 5/167 408/1 BD |
| 2019/0143418 A1 | 5/2019 | Su | |

* cited by examiner

ROTARY CUTTER FOR CUTTING DAMAGED THREADS OF A BOLT

CROSS REFERENCE

This application is a continuation-in-part of U.S. patent application Ser. No. 16/787,222, filed on Feb. 11, 2020, which is hereby incorporated herein by reference.

BACKGROUND OF THE INVENTION

1. Field of the Invention

The present invention relates to a rotary cutter and, more particularly, to a rotary cutter for cutting damaged threads of a bolt.

2. Description of the Related Art

A bolt is generally used to fasten an object, and a nut is mounted around the bolt. A distal end of the bolt could rust, accumulate dirt, or even deform under impact by an alien object, such that the nut cannot be smoothly threaded onto the bolt. A generally approach in this situation is cut the bolt with a screw die to remove rust, dirt, or the damaged portion from the bolt.

When a bolt encounters the above situation, the nut merely gets stuck on the distal end of the bolt, and the remaining portion of the bolt is still useable. In the approach using the screw die, the screw die must be precisely aligned with the threads of the bolt before cutting, so as to assure the cutting route is identical to the original threads of the bolt, which is time-consuming and has low efficiency.

Taiwan Invention Patent No. 1640378 discloses a rotary cutter including a body rotatable about a rotating axis. The body includes a cutting space and a first cutting blade disposed on an inner periphery of the cutting space. The body further includes a virtual projection plane perpendicular to the rotating axis. A first virtual plane passes through the first cutting blade and extends perpendicularly to the virtual projection plane. A virtual circle and a first virtual reference line are located on the virtual projection plane. The first virtual reference line intersects with the rotating axis and passes through an intersection of the first virtual plane and the virtual circle. An angle between the first virtual reference line and the first virtual plane is between 20° and 40°.

The major advantage of the above rotary cutter is the conical design that permits cutting of various bolts of larger or smaller diameters. The rotary cutter rotates at a constant speed. However, the contact point in the case of cutting a large-diameter bolt is different from the contact point in the case of cutting a small-diameter bolt. Thus, the cutting speed will change when the diameter is changed while the cutting angle of the first cutting blade is fixed. As a result, the cutting result is bad when the cutting position does not match with the cutting angle and the cutting speed. Furthermore, friction tends to occur between the inner wall face of the rotary cutter and the bolt.

Thus, a need exists for a novel rotary cutter that mitigates and/or obviates the above disadvantages.

BRIEF SUMMARY OF THE INVENTION

The primary objective of the present invention is to provide a rotary cutter for cutting damaged threads of a bolt. The rotary cutter includes a body and an inner periphery of the body delimits a conic cutting space. The body further includes at least one cutting blade, an evasive groove, an evasive portion, a scrap discharge groove, a scrap guide groove and a scrap discharge orifice on the inner periphery delimiting the cutting space. The at least one cutting blade forms a ridge. The evasive groove and the scrap discharge groove are respectively located on a rear side and a front side of the at least one cutting blade along a circumferential direction of the inner periphery of the body. The scrap guide groove extends between the evasive groove and the scrap discharge orifice.

The rotary cutter according to the present invention can cut a bolt while preventing the bolt from rubbing against the portions of the rotary cutter other than the at least one cutting blade, achieving an excellent cutting effect.

The present invention will become clearer in light of the following detailed description of illustrative embodiments of this invention described in connection with the drawings.

DETAILED DESCRIPTION OF THE INVENTION

Figure 1:
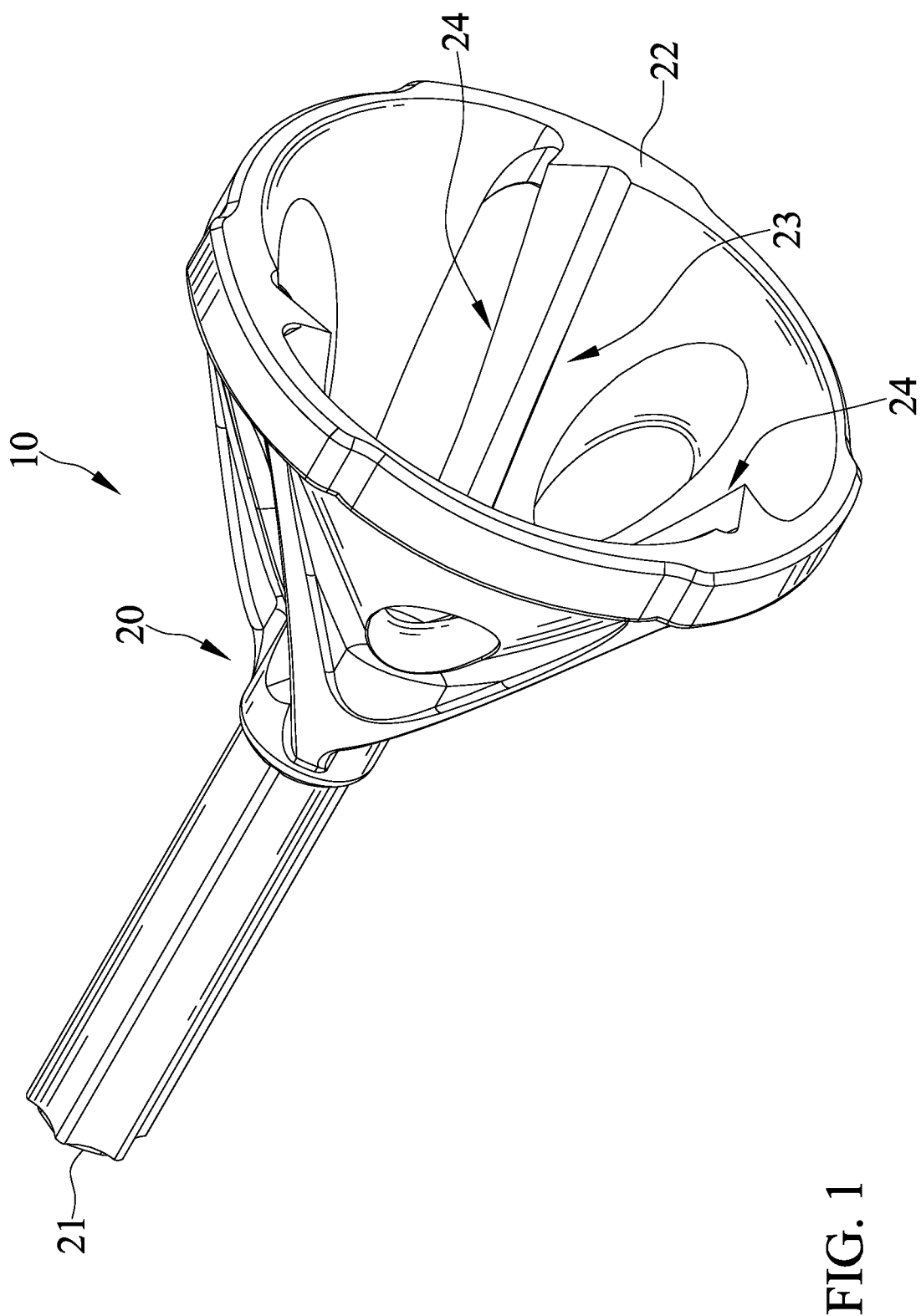
FIG. 1 is a perspective view of a rotary cutter for cutting damaged threads of a bolt of an embodiment according to a first embodiment of the present invention.
Figure 2:
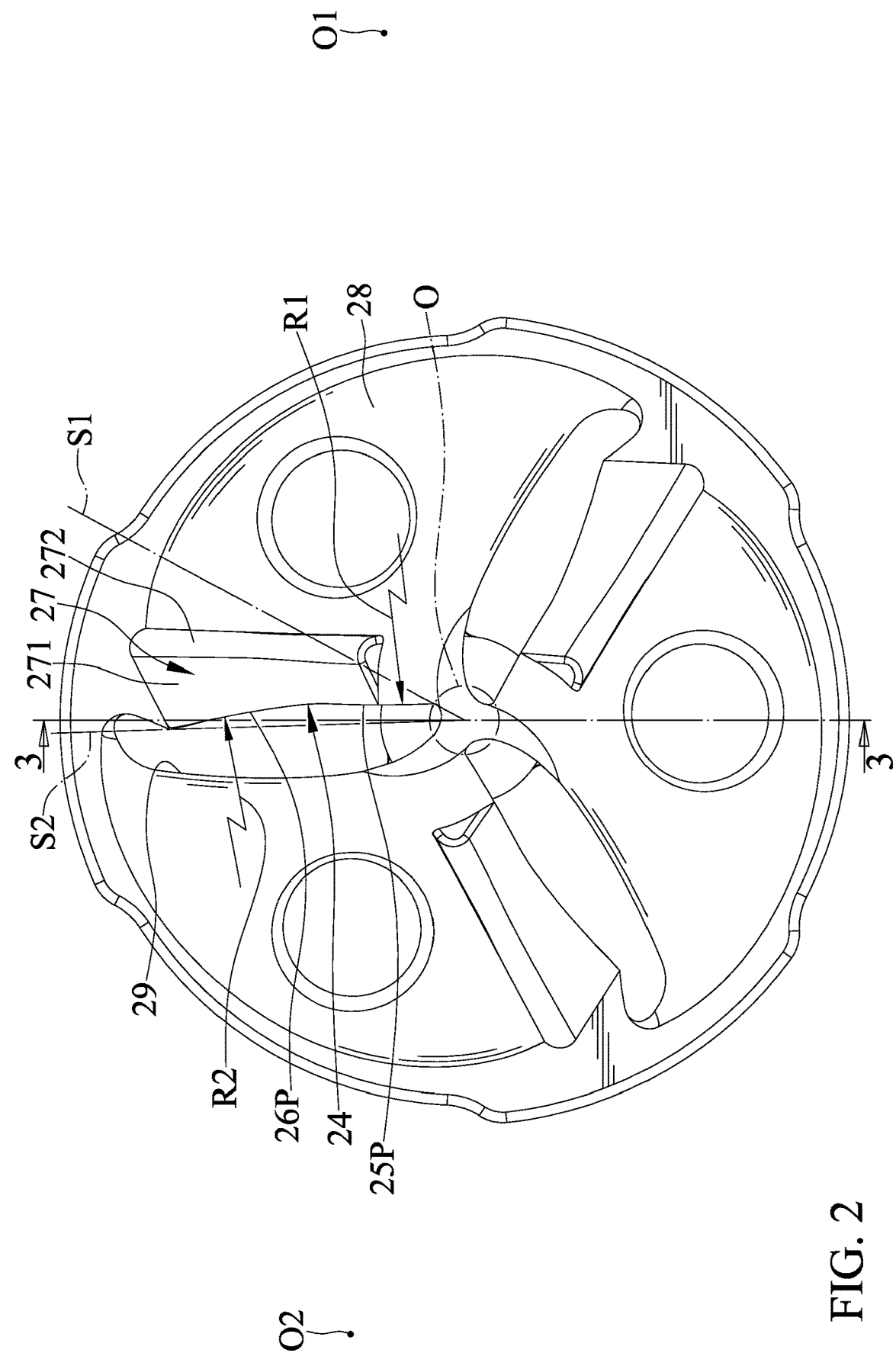
FIG. 2 is a side elevational view of the rotary cutter of FIG. 1.
Figure 3:
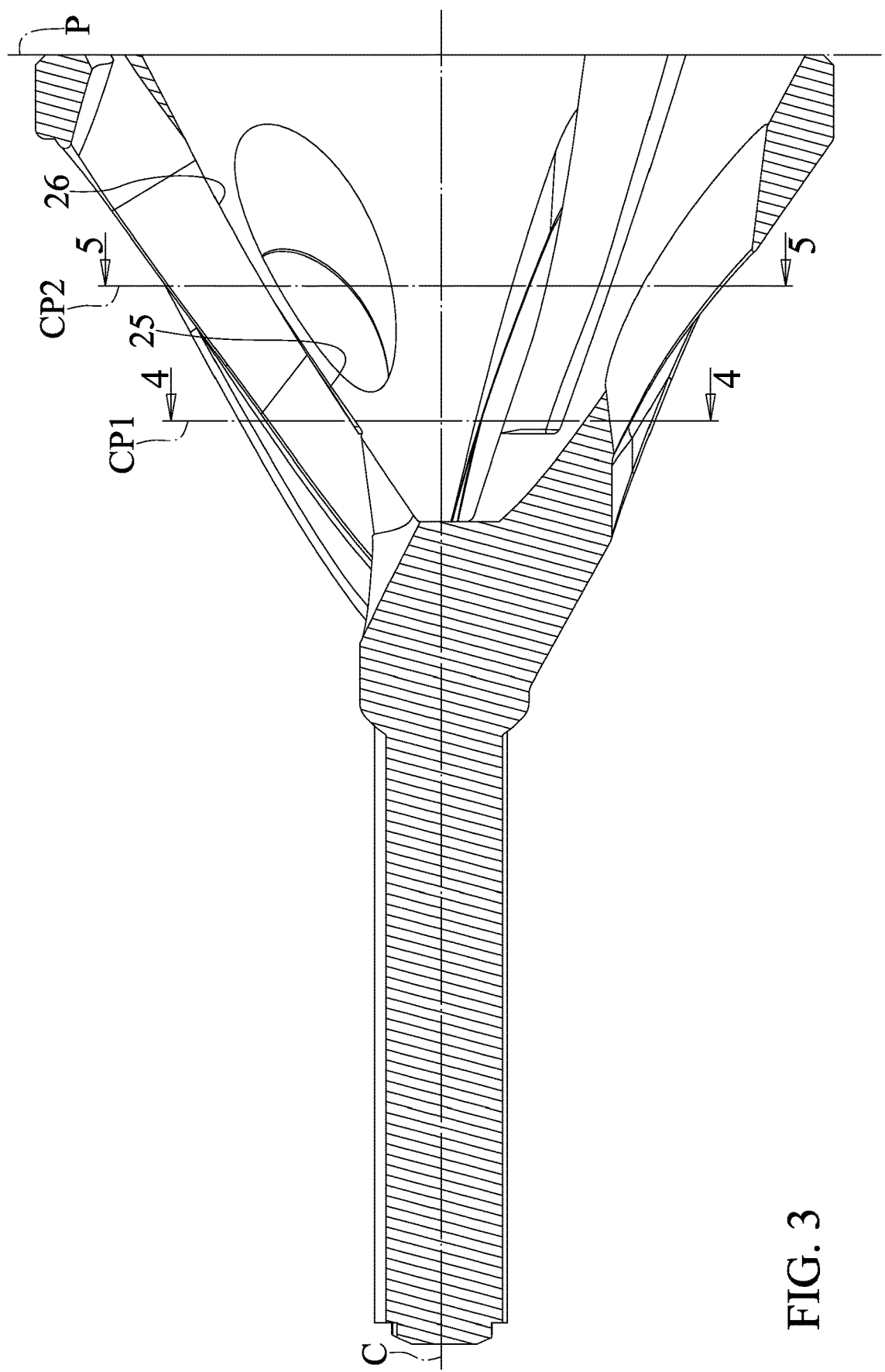
FIG. 3 is a cross sectional view taken along section line 3-3 of FIG. 2.
Figure 4:
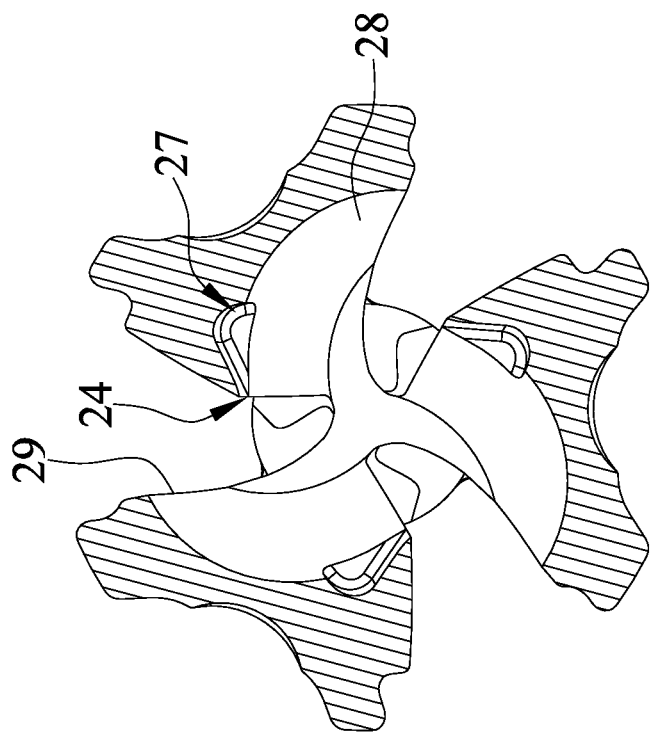
FIG. 4 is a cross sectional view taken along section line 4-4 of FIG. 3.
Figure 5:
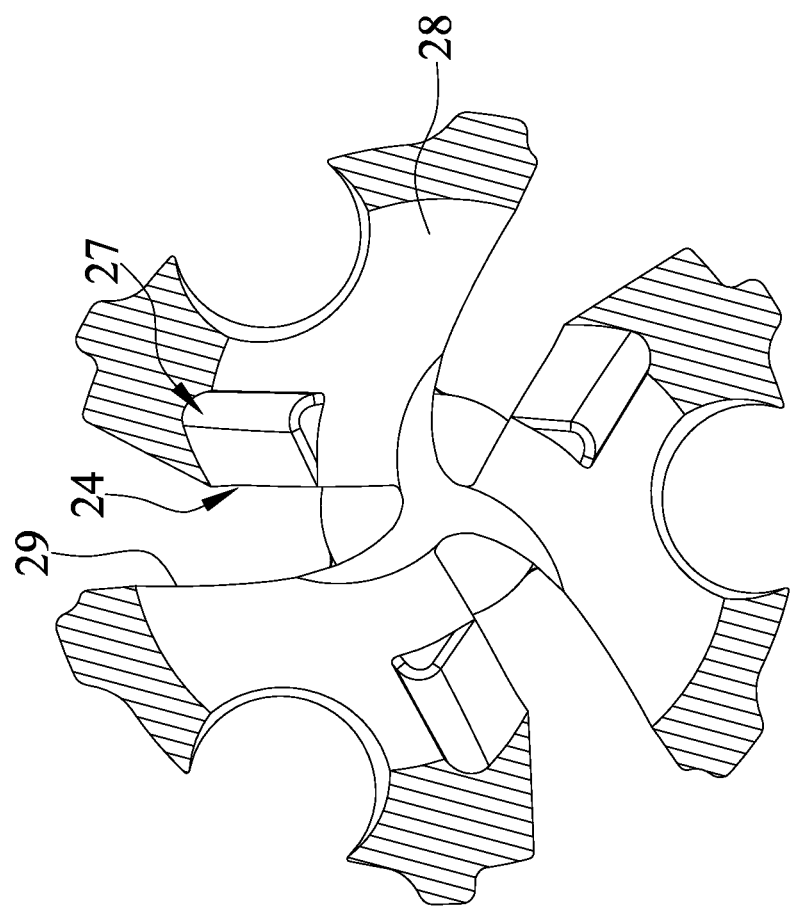
FIG. 5 is cross sectional view taken along section line 5-5 of FIG. 3.

With reference to FIGS. 1-5, a rotary cutter 10 for cutting damaged threads of a bolt of a first embodiment according to the present invention includes a body 20 rotatable about a rotating axis C. The body 20 includes a connecting end 21 and an operative end 22 opposite to the connecting end 21 along the rotating axis C. The connecting end 21 can be coupled to an electric tool or a pneumatic tool. The body 20 includes an inner periphery delimiting a cutting space 23 extending along the rotating axis C from the operative end 22 towards but spaced from the connecting end 21. A width of the cutting space 23 in a diametric direction perpendicular to the rotating axis C gradually reduces from the operative end 22 toward the connecting end 21 to form a conic space.

The body 20 further includes at least one cutting blade 24 disposed on the inner periphery thereof. The at least one cutting blade 24 includes a first cutting blade section 25 and a second cutting blade section 26. The first cutting blade section 25 is arcuate or rectilinear. The second cutting blade section 26 is arcuate or rectilinear. The first and second cutting blade sections 25 and 26 are not identical. The at least one cutting blade 24 is integrally formed with the body 20. The body 20 further includes a virtual projection plane P perpendicular to the rotating axis C. A first cutting blade section projection 25P is a projection of the first cutting blade section 25 on the virtual projection plane P. The first cutting blade section projection 25P includes a first center of circle O1 located on a side of the first cutting blade section projection 25P adjacent to a rear side of the first cutting blade section 25. The first cutting blade section projection 25P is an arcuate line and is concave towards the first center of circle O1. A first radius R1 is equal to a spacing between the first center of circle O1 and the first cutting blade section projection 25P and is in a range between 20 cm and 50 cm. In this embodiment, the first radius R1 is in a range between 25 mm and 35 mm.

A second cutting blade section projection 26P is a projection of the second cutting blade section 26 on the virtual projection plane P and is on a side of the first cutting blade section projection 25P opposite to the rotating axis C. The second cutting blade section projection 26P includes a second center of circle O2 located on a side of the second cutting blade section projection 26P adjacent to a front side of the second cutting blade section 26. The second cutting blade section projection 26P is an arcuate line and is concave towards the second center of circle O2. A second radius R2 is equal to a spacing between the second center of circle O2 and the second cutting blade section projection 26P and is in a range between 50 cm and 80 cm. In this embodiment, the second radius R2 is in a range between 60 mm and 70 mm. The second cutting blade section projection 26P is tangent to the first cutting blade section projection 25P in this embodiment.

The virtual projection plane P includes a virtual circle O, a first virtual reference line S1, and a second virtual reference line S2. The virtual circle O has a diameter between 1 mm and 20 mm. An end of the first cutting blade section projection 25P adjacent to the rotating axis C is located on the virtual circle O. The first virtual reference line S1 intersects with the rotating axis C and passes through the end of the first cutting blade section projection 25P. The second virtual reference line S2 intersects with the rotating axis C and passes through an end of the second cutting blade section projection 26P distant from the rotating axis C. An angle between the first virtual reference line S1 and the second virtual reference line S2 is between 20° and 40°. In this embodiment, the angle between first virtual reference line S1 and the second virtual reference line S2 is between 25° and 35°.

A first virtual cutting plane CP1 extends perpendicularly to the rotating axis C and intersects with the at least one cutting blade 24. On the first virtual cutting plane CP1, a spacing between the at least one cutting blade 24 and the rotating axis C is smaller than a spacing between any point on an inner periphery of the body 20 delimiting the cutting space 23 and the rotating axis C. In this embodiment, the first virtual cutting plane CP1 intersects with the first cutting blade section 25. A spacing between the first cutting blade section 25 and the rotating axis C is smaller than the spacing between any point on the inner periphery of the body 20 delimiting the cutting space 23 and the rotating axis C (see FIG. 4). A second virtual cutting plane CP2 extends perpendicularly to the rotating axis C and intersects with the second cutting blade section 26. On the second virtual cutting plane CP2, a spacing between the second cutting blade section 26 and the rotating axis C is smaller than the spacing between any point on the inner periphery of the body 20 delimiting the cutting space 23 and the rotating axis C (see FIG. 5).

The inner periphery of the body 20 delimiting the cutting space 23 includes an evasive groove 27 and an evasive portion 28. Furthermore, the inner periphery of the body 20 delimiting the cutting space 23 includes a scrap discharge groove 29 in a radial direction perpendicular to the rotating axis C. The evasive groove 27, the evasive portion 28, and the scrap discharge groove 29 relate to the at least one cutting blade 24. The evasive groove 27 is located on a rear side of the at least one cutting blade 24 and includes a first evasive face 271 on an inner peripheral wall thereof. A first side of the first evasive face 271 is connected to the at least one cutting blade 24 and extends in a direction parallel to an extending direction of the at least one cutting blade 24. A second side of the first evasive face 271 is opposite to the at least one cutting blade 24 and is located between the evasive portion 28 and the first side of the first evasive face 271.

On the first virtual cutting plane CP1 or the second virtual cutting plane CP2, a spacing between the evasive portion 28 and the rotating axis C is smaller than a spacing between the first side of the first evasive face 271 and the rotating axis C. Furthermore, a spacing between the second side of the first evasive face 271 and the rotating axis C is smaller than a side of the evasive portion 28 adjacent to the evasive groove 27 and the rotating axis C. A spacing from the evasive portion 28 to the rotating axis C gradually increases from a side of the evasive portion 28 adjacent to the at least one cutting blade 24 towards another side of the evasive portion 28 distant from the at least one cutting blade 24. The scrap discharge groove 29 is located on a front side of the at least one cutting blade 24 and is contiguous to the at least one cutting blade 24. An end of the scrap discharge groove 29 intercommunicates with the cutting space 23. Another end of the scrap discharge groove 29 extends through the body 20 to an outer periphery of the body 20.

The inner peripheral wall of the evasive groove 27 further includes a second evasive face 272. A side of the second evasive face 272 is connected to the second side of the first evasive face 271 opposite to the at least one cutting blade 24. Another side of the second evasive face 272 is connected to the evasive portion 28. The second evasive face 272 extends in a direction parallel to the extending direction of the at least one cutting blade 24. The first evasive face 271 is planar. The second evasive face 272 is concave.

In this embodiment, the inner periphery of the body 20 includes three cutting blades 24 spaced from each other by regular angular intervals in a circumferential direction about the rotating axis C.

Figure 6:
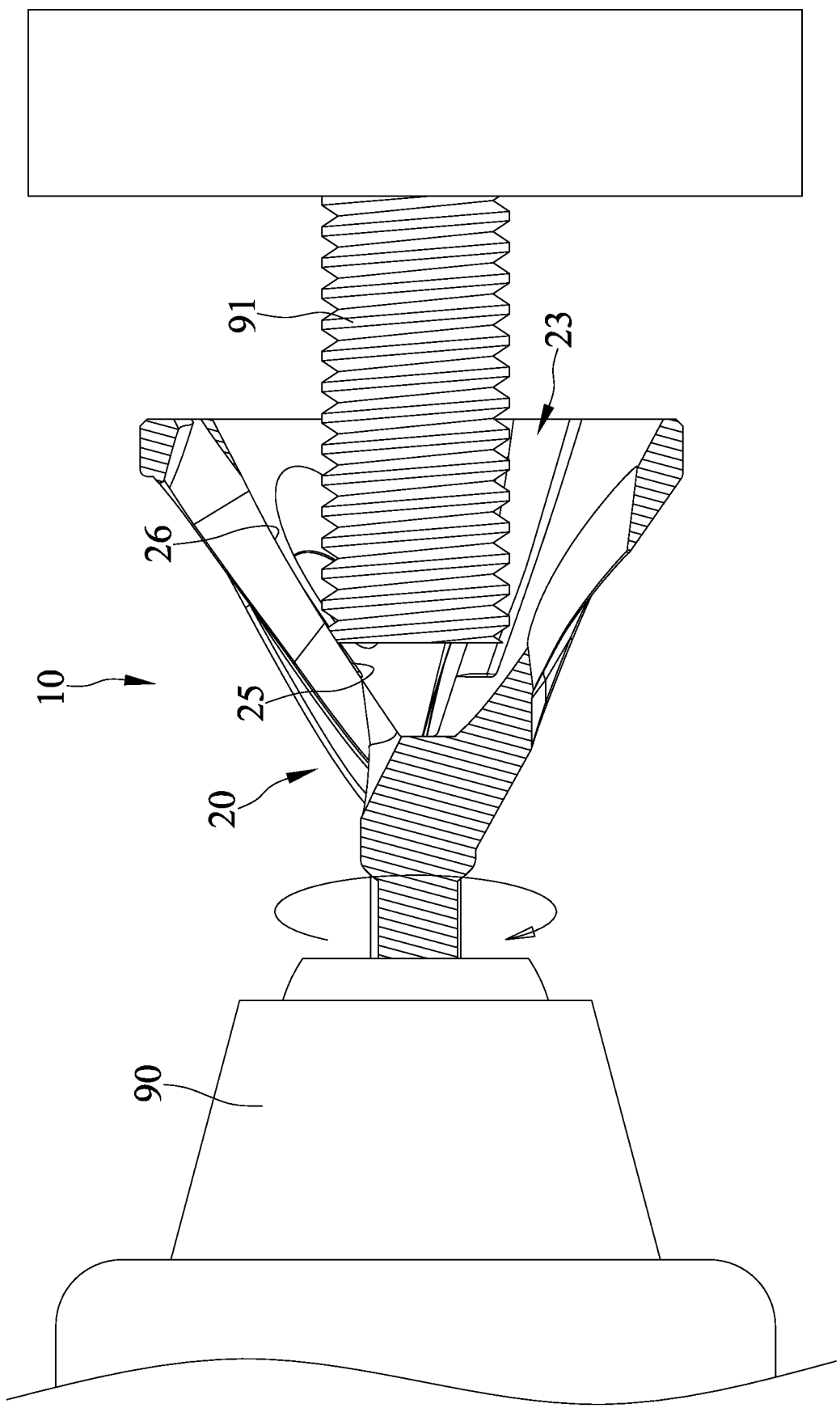
FIG. 6 is a diagrammatic cross sectional view of the rotary cutter of FIG. 1 used to cut a bolt.
Figure 7:
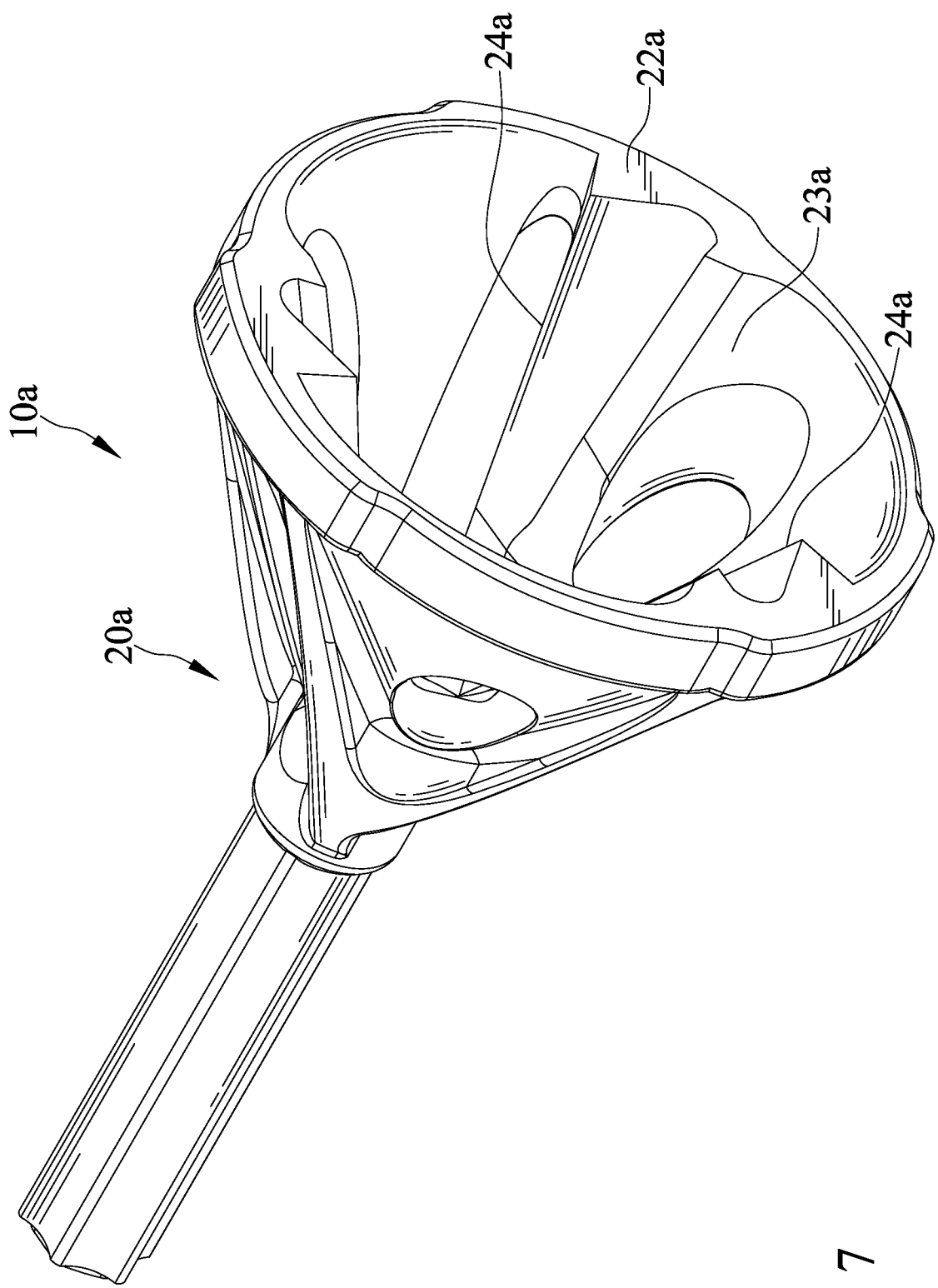
FIG. 7 is a perspective view of a rotary cutter for cutting damaged threads of a bolt of an embodiment according to a second embodiment of the present invention.
Figure 8:
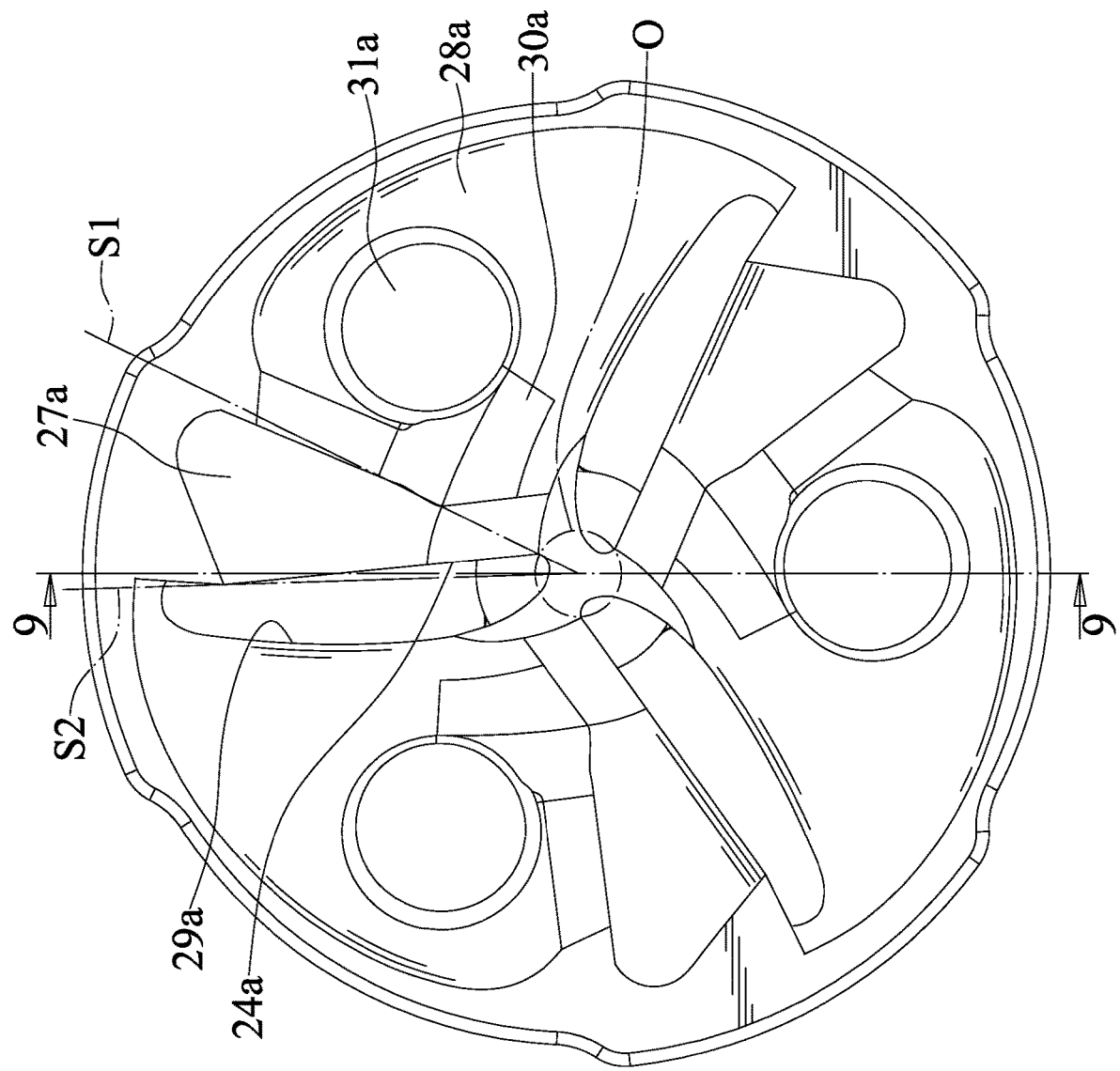
FIG. 8 is a side elevational view of the rotary cutter of FIG. 7.
Figure 9:
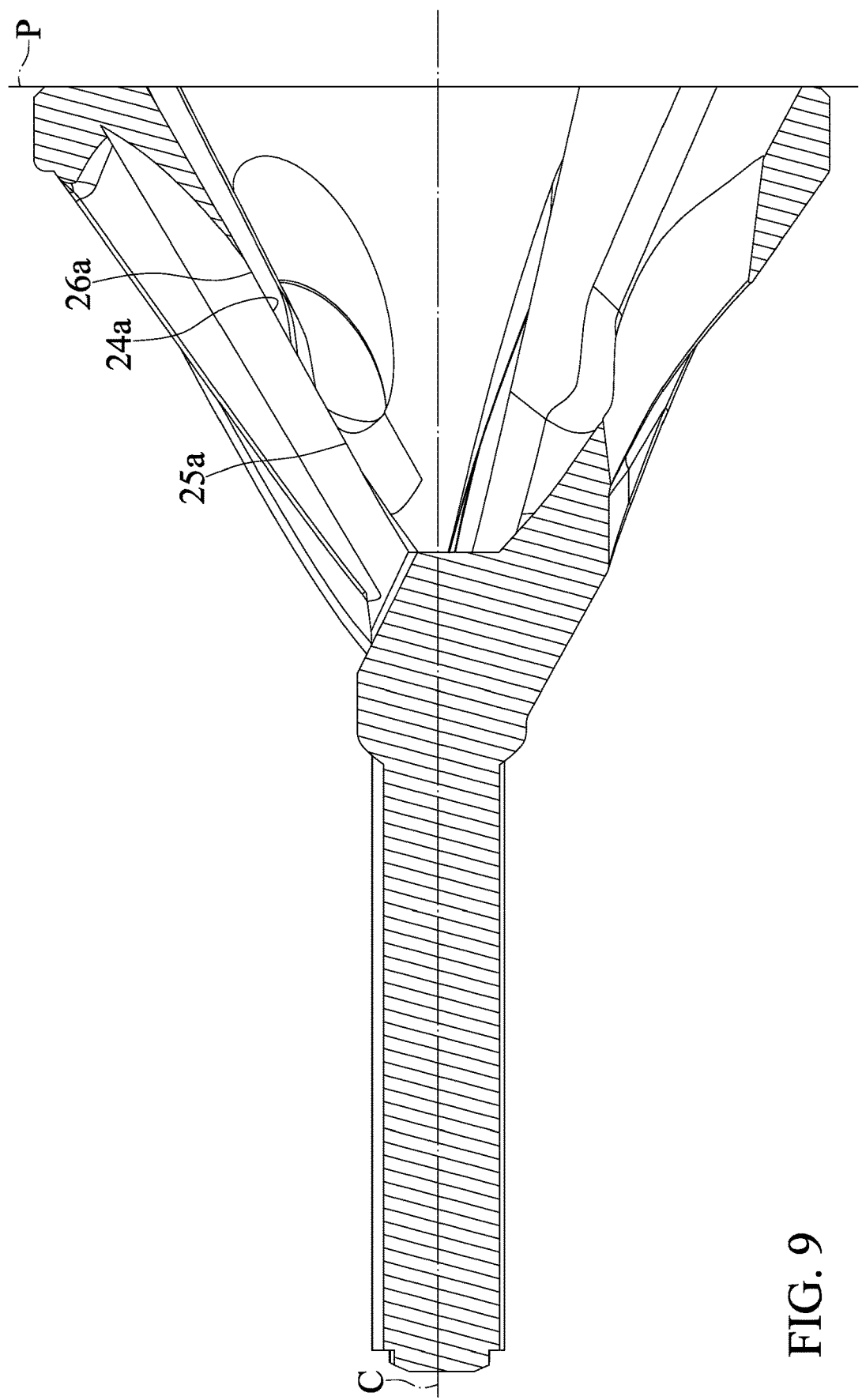
FIG. 9 is a cross sectional view taken along section line 9-9 of FIG. 8.

With reference to FIG. 6, when in use of the rotary cutter 10 of the first embodiment according to the present invention, the connecting end 21 is coupled to a driving tool 90, and the cutting space 23 holds a distal end of a bolt 91. The driving tool 90 drives the rotary cutter 10 to rotate. The at least one cutting blade 24 shortens or cuts off a portion of the thread on the distal end of the bolt 91, such that a nut can be easily threaded onto the bolt 91.

FIGS. 7-10 show a rotary cutter 10a for cutting damaged threads of a bolt of a second embodiment according to the present invention, and the same numbers are used to correlate similar components of the first embodiment, but bearing a letter a. The rotary cutter 10a includes a body 20a. The body 20a includes an operative end 22a. The body 20a at the operative end 22a includes an inner periphery delimiting a cutting space 23a. The cutting space 23a forms a conic space. The cutting space 23a is in a form of an inverted cone, with a width of the cutting space 23a in a diametric direction gradually reduces from an open end of the operative end 22a, which has the greatest diameter. The body 20a is rotatable about a rotating axis C. The body 20a includes a virtual projection plane P perpendicular to the rotating axis C. The virtual projection plane P includes a virtual circle O, a first virtual reference line S1, and a second virtual reference line S2. The virtual circle O has a diameter between 1 mm and 20 mm.

The body 20a includes at least one cutting blade 24a integrally formed from the inner periphery thereof. The at least one cutting blade 24a includes a first cutting blade section 25a and a second cutting blade section 26a. An end of the first cutting blade section 25a adjacent to the rotating axis C is located on the virtual circle O. The first virtual reference line S1 intersects with the rotating axis C and passes through the end of the first cutting blade section 25a. The second virtual reference line S2 intersects with the rotating axis C and passes through an end of the second cutting blade section 26a distant from the rotating axis C. An angle between the first virtual reference line S1 and the second virtual reference line S2 is between 20° and 40°. In contrast to the first embodiment, the first and the second cutting blade sections 25a and 26a are rectilinear. Moreover, the first and the second cutting blades sections 25a and 26a are aligned.

The body 20a has at least one ridge forming the at least one cutting blade 24a. In the embodiment, the at least one cutting blade 24a includes three cutting blades 24a, which are spaced from one another by regular angular intervals in a circumferential direction of the body 20a. The inner periphery of the body 20a delimiting the cutting space 23a includes an evasive groove 27a, an evasive portion 28a, and a scrap discharge groove 29a relating to the at least one cutting blade 24a. The evasive groove 27a is located on a rear side of the at least one cutting blade 24a. The scrap discharge groove 29a is located on a front side of the at least one cutting blade 24a and is contiguous to the at least one cutting blade 24a. An end of the scrap discharge groove 29a intercommunicates with the cutting space 23a. Another end of the scrap discharge groove 29a extends through the body 20a to an outer periphery of the body 20a. In contrast to the first embodiment, the inner periphery of the body 20a delimiting the cutting space 23a further includes a scrap guide groove 30a extending between the evasive groove 27a and a scrap discharge orifice 31a. The scrap guide groove 30a extends circumferentially along the inner periphery of the body 20a. The scrap guide groove 30a is recessed and does not extend through the body 20a. The scrap discharge orifice 31a extends through the body 20a. An end of the scrap discharge orifice 31a intercommunicates with the cutting space 23a. Another end of the scrap discharge orifice 31a extends through the body 20a to the outer periphery of the body 20a. Thus, the scrap cut from the bolt 91 can be guided by the scrap guide groove 30a to the scrap discharge orifice 31a and discharged from the scrap discharge orifice 31a afterward.

Figure 10:
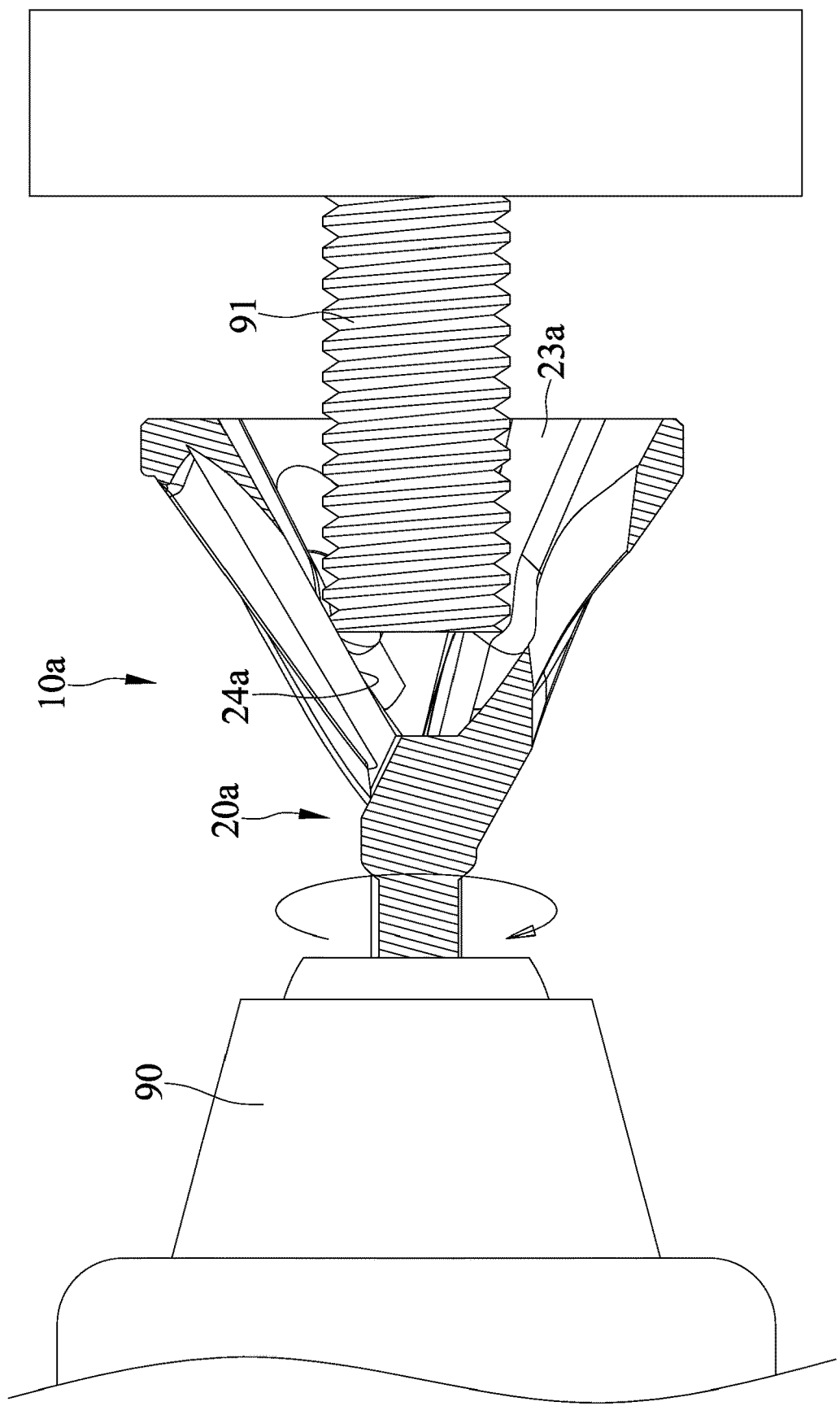
FIG. 10 is a diagrammatic cross sectional view of the rotary cutter of FIG. 7 used to cut a bolt.

With reference to FIG. 10, when in use of the rotary cutter 10a, the body 20a is rotatable about the rotating axis C, the operative end 22a engages the bolt 91 and the cutting space 23a receives a distal end of the bolt 91. The driving tool 90 drives the rotary cutter 10a to rotate. The at least one cutting blade 24a shortens or cuts off a portion of the thread on the distal end of the bolt 91, such that a nut can be easily threaded onto the bolt 91.

In view of the above structure of the rotary cutters 10 and 10a, since only the at least one cutting blade 24 and the at least one cutting blade 24a contact the bolt 91, the resistance resulting from friction is reduced to assure a smooth cutting process, and the scrap resulting from the cutting can be discharged through the scrap discharge grooves 29 and 29a. Through provision of the evasive grooves 27 and 27a, the bolt 91 is prevented from rubbing against the portions of the rotary cutter 10 other than the at least one cutting blade 24 even if the rotary cutters 10 and 10a are fed at a faster speed during cutting, increasing the operating efficiency. Furthermore, the rotary cutter 10 having the above multi-stage design has different cutting speeds for cutting bolts having different diameters when the rotary cutter 10 has a constant rotating speed. Specifically, the rotary cutter 10 can cut bolts of different diameters by the first cutting blade section 25 or by the second cutting blade section 26. Through the arrangement of the rotary cutter 10 cutting bolts of different diameters by the cutting blade sections of different angles, a proper cutting angle is provided regardless of the diameter of the bolt being cut by the rotary cutter 10 while providing an excellent cutting effect.

Conclusively, the rotary cutters 10 and 10a according to the present invention can cut the bolt 91 while preventing the bolt 91 from rubbing against the portions of the rotary cutter 10 other than the at least one cutting blade 24, achieving an excellent cutting effect.

Although specific embodiments have been illustrated and described, numerous modifications and variations are still possible without departing from the scope of the invention. The scope of the invention is limited by the accompanying claims.

The invention claimed is:

1. A rotary cutter for cutting damaged threads of a bolt, comprising:
   a body including an inner periphery delimiting a conic cutting space, wherein the body further includes at least one cutting blade, an evasive groove, an evasive portion, a scrap discharge groove, a scrap guide groove and a scrap discharge orifice on the inner periphery delimiting the cutting space, wherein the at least one cutting blade forms a ridge, wherein the evasive groove and the scrap discharge groove are respectively located on a rear side and a front side of the at least one cutting blade along a circumferential direction of the inner periphery of the body, and wherein the scrap guide groove extends between the evasive groove and the scrap discharge orifice.

2. The rotary cutter as claimed in claim 1, wherein the cutting space is in a form of an inverted cone, with a width of the cutting space in a diametric direction gradually reduces from an open end of an operative end of the body, which has the greatest diameter.

3. The rotary cutter as claimed in claim 1, wherein the at least one cutting blade includes a first cutting blade section and a second cutting blade section, wherein the first cutting blade section is rectilinear, and wherein the second cutting blade section is rectilinear and aligned with the first cutting blade sections.

4. The rotary cutter as claimed in claim 3, wherein the body is rotatable about a rotating axis, wherein the body includes a virtual projection plane perpendicular to the rotating axis, wherein the virtual projection plane includes a virtual circle, a first virtual reference line, and a second virtual reference line, wherein the virtual circle has a diameter between 1 mm and 20 mm, wherein an end of the first cutting blade section adjacent to the rotating axis is located on the virtual circle, the first virtual reference line intersects with the rotating axis and passes through the end of the first cutting blade section, wherein the second virtual reference line intersects with the rotating axis and passes through an end of the second cutting blade section distant from the rotating axis, and wherein an angle between the first virtual reference line and the second virtual reference line is between 20° and 40°.

5. The rotary cutter as claimed in claim 4, wherein the at least one cutting blade includes three cutting blades spaced from each other by regular angular intervals in a circumferential direction about the rotating axis.

6. The rotary cutter as claimed in claim 3, wherein the body is rotatable about a rotating axis, wherein the body includes a virtual projection plane perpendicular to the rotating axis, wherein the virtual projection plane includes a virtual circle, a first virtual reference line, and a second virtual reference line, wherein the virtual circle has a diameter between 1 mm and 20 mm, wherein an end of the first cutting blade section adjacent to the rotating axis is located on the virtual circle, the first virtual reference line intersects with the rotating axis and passes through the end of the first cutting blade section, wherein the second virtual reference line intersects with the rotating axis and passes through an end of the second cutting blade section distant from the rotating axis, and wherein an angle between the first virtual reference line and the second virtual reference line is between 20° and 40°.

7. The rotary cutter as claimed in claim 6, wherein the at least one cutting blade includes three cutting blades spaced from each other by regular angular intervals in a circumferential direction about the rotating axis.

8. The rotary cutter as claimed in claim 6, wherein the scrap guide groove extends circumferentially along the inner periphery of the body, and wherein the scrap guide groove is recessed and does not extend through the body.

9. The rotary cutter as claimed in claim 8, wherein the scrap discharge groove and the scrap discharge orifice extend through the body.

10. The rotary cutter as claimed in claim 1, wherein the at least one cutting blade is integrally formed from the inner periphery of the body.

11. The rotary cutter as claimed in claim 1, wherein the scrap guide groove extends circumferentially along the inner periphery of the body, and wherein the scrap guide groove is recessed and does not extend through the body.

12. The rotary cutter as claimed in claim 11, wherein the scrap discharge groove and the scrap discharge orifice extend through the body.

* * * * *